United States Patent
Arihara

(10) Patent No.: US 10,094,417 B2
(45) Date of Patent: Oct. 9, 2018

(54) TILTING PAD JOURNAL BEARING

(71) Applicant: Kobe Steel, Ltd., Hyogo (JP)

(72) Inventor: Hirotoshi Arihara, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 15/543,240

(22) PCT Filed: Jan. 22, 2016

(86) PCT No.: PCT/JP2016/051830
§ 371 (c)(1),
(2) Date: Jul. 13, 2017

(87) PCT Pub. No.: WO2016/121640
PCT Pub. Date: Aug. 4, 2016

(65) Prior Publication Data
US 2018/0003220 A1    Jan. 4, 2018

(30) Foreign Application Priority Data

Jan. 28, 2015   (JP) .................. 2015-014219

(51) Int. Cl.
*F16C 17/03*   (2006.01)
*F16C 17/26*   (2006.01)
(Continued)

(52) U.S. Cl.
CPC .............. *F16C 17/03* (2013.01); *F16C 17/26* (2013.01); *F16C 33/10* (2013.01); *F16C 33/107* (2013.01);
(Continued)

(58) Field of Classification Search
CPC ........ F16C 17/03; F16C 17/035; F16C 17/06; F16C 17/10; F16C 17/26; F16C 33/10;
(Continued)

(56) References Cited

U.S. PATENT DOCUMENTS 3,004,804 A  * 10/1961 Pinkus ................... F16C 17/03
                                                    384/311
3,339,990 A  *  9/1967 Wendt .................... F16C 17/03
                                                    384/311
(Continued)

FOREIGN PATENT DOCUMENTS

JP    2003-113834 A    4/2003
JP    2009-030704 A    2/2009
(Continued)

OTHER PUBLICATIONS

International Search Report issued in PCT/JP2016/051830; dated Apr. 19, 2016.

*Primary Examiner* — Marcus Charles
(74) *Attorney, Agent, or Firm* — Studebaker & Brackett PC

(57) ABSTRACT

On a facing surface (12a) of a pad (12) that faces a rotation shaft, an oil supply unit (24) is provided in an end region downstream of the rotation shaft in the rotation direction, and the oil supply unit (24) is formed along part of an isopleth of the pressure distribution on the facing surface (12a) generated by a lubricant being caught between the rotation shaft and the facing surface (12a), said part of the isopleth being downstream, in the rotation direction, of the pressure maximum of the pressure distribution.

15 Claims, 7 Drawing Sheets

(51) Int. Cl.
*F16C 33/10* (2006.01)
*F16C 17/06* (2006.01)
*F16C 32/06* (2006.01)
*F16C 17/24* (2006.01)

(52) U.S. Cl.
CPC ........ *F16C 33/1085* (2013.01); *F16C 17/243* (2013.01); *F16C 32/0655* (2013.01); *F16C 32/0666* (2013.01)

(58) Field of Classification Search
CPC .............. F16C 33/1025; F16C 33/1045; F16C 33/1065; F16C 33/1085; F16C 32/064; F16C 32/0655; F16C 32/0666; F16C 37/002
USPC ........ 384/111, 117, 122, 306–312, 291, 322, 384/398, 316
See application file for complete search history.

(56) References Cited

U.S. PATENT DOCUMENTS

| | | | | |
|---|---|---|---|---|
| 3,784,266 | A * | 1/1974 | Parlevliet | F16C 17/06 384/286 |
| 3,891,281 | A * | 6/1975 | Jenness | F16C 13/04 384/100 |
| 4,746,230 | A * | 5/1988 | Jensen | F16C 17/03 384/311 |
| 5,702,186 | A * | 12/1997 | Hackstie | F16C 33/1065 384/117 |
| 6,588,933 | B2 * | 7/2003 | Ferguson | F16C 17/04 384/122 |
| 8,657,501 | B2 * | 2/2014 | Palomba | F16C 17/03 384/117 |
| 9,121,448 | B2 * | 9/2015 | Delgado Marquez | F01D 25/166 |
| 2012/0099993 | A1 | 4/2012 | Guerenbourg et al. | |
| 2013/0330030 | A1 * | 12/2013 | Suzuki | F16C 17/03 384/322 |
| 2015/0104123 | A1 * | 4/2015 | Ertas | F01D 25/164 384/119 |
| 2015/0369278 | A1 | 12/2015 | Nishioka et al. | |
| 2016/0069387 | A1 * | 3/2016 | Nishioka | F16C 32/0659 384/117 |
| 2016/0169275 | A1 * | 6/2016 | Sato | F16C 33/108 384/117 |

FOREIGN PATENT DOCUMENTS

JP 2012-532279 A 12/2012
WO 2014/119652 A1 8/2014

* cited by examiner

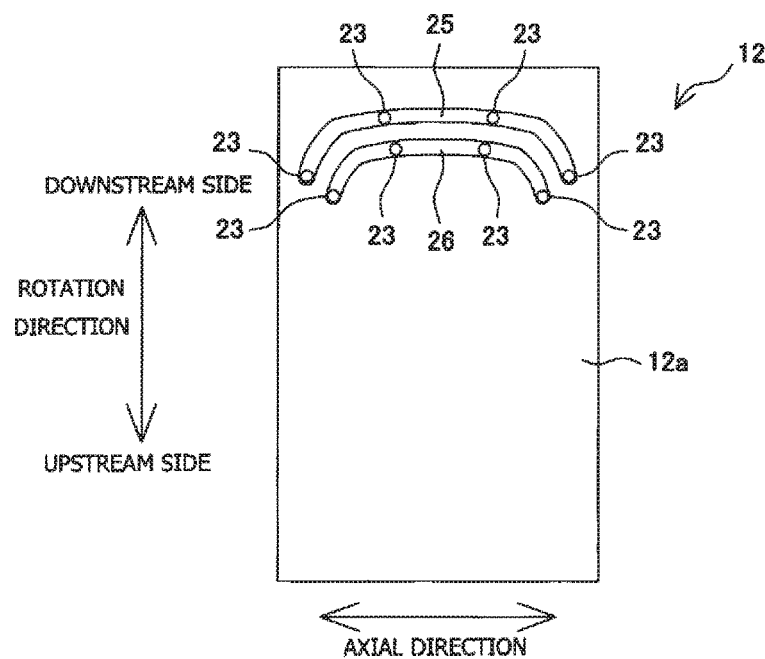
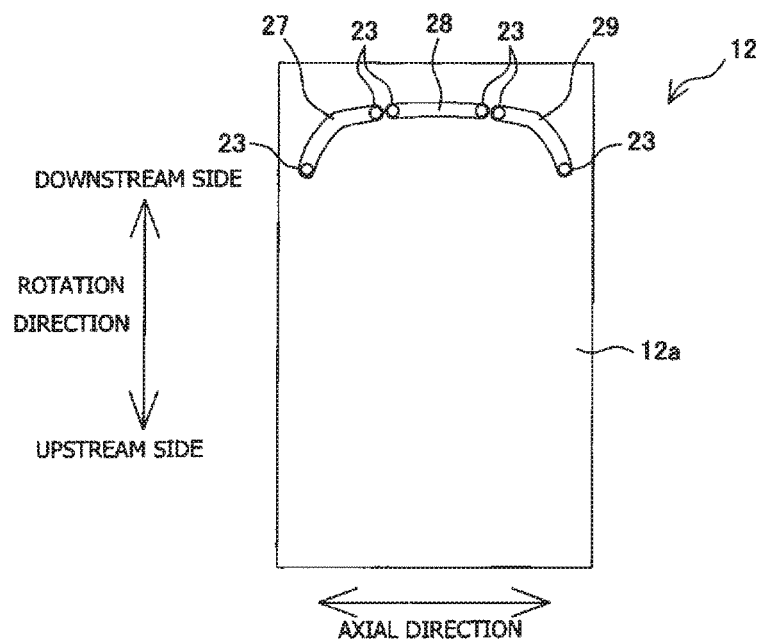

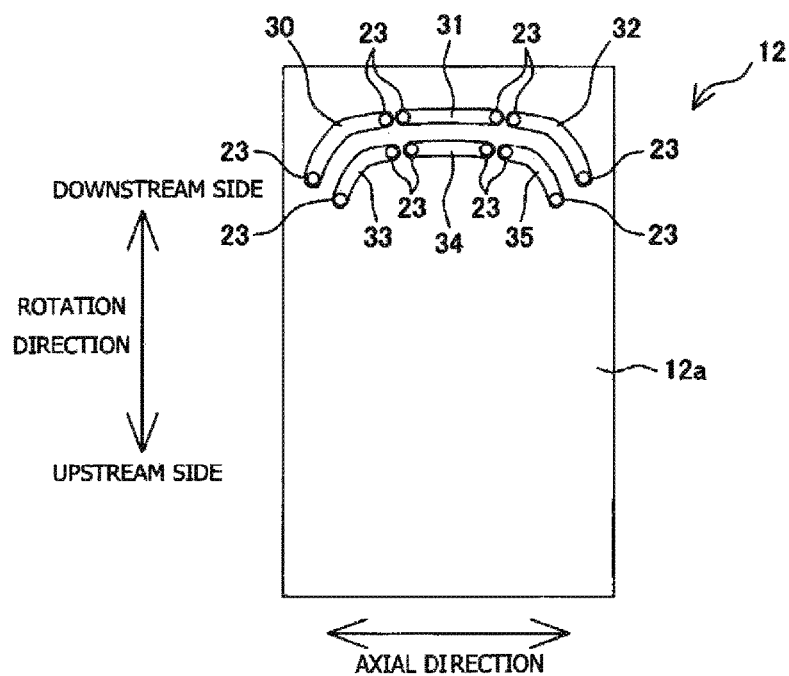
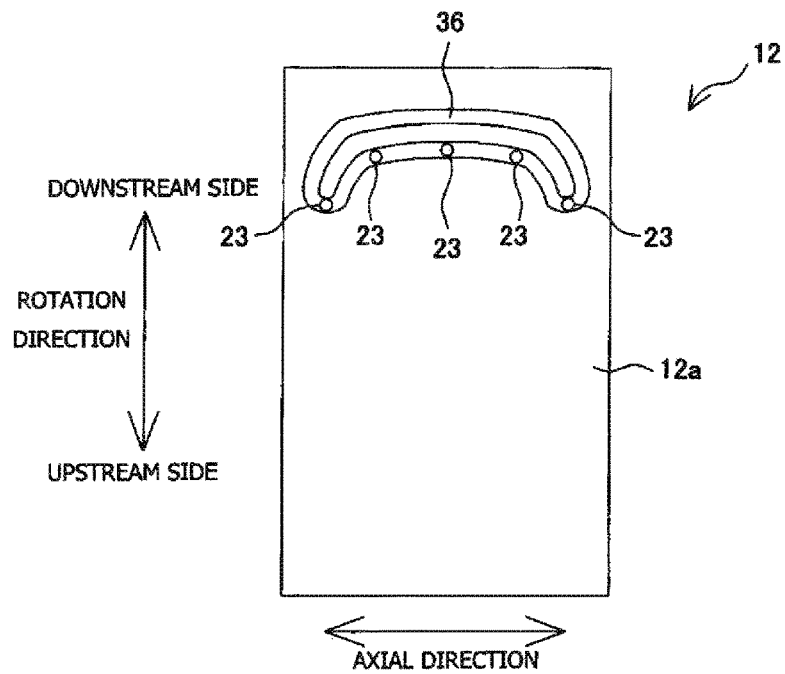

US 10,094,417 B2

TILTING PAD JOURNAL BEARING

CROSS REFERENCE TO RELATED APPLICATION

The present application is a national stage application under a 35 U.S.C. 371, entering a national phase from PCT/JP2016/051830, filed on Jan. 22, 2016 which claims priority to Japanese Patent Application No. 2015-014219, filed on Jan. 28, 2015.

TECHNICAL FIELD

The present invention relates to a tilting pad journal bearing which supports a rotary shaft by a plurality of pads arranged around the rotary shaft so that the rotary shaft is rotatable.

BACKGROUND ART

A tilting pad journal bearing that can suppress unstable vibrations such as oil whip or oil whirl often used in a rotary machine where a rotary shaft rotates at high speed. The tilting pad journal bearing is a bearing which supports a rotary shaft by plural pads arranged around the rotary shaft so that the rotary shaft is rotatable. The tilting pad journal bearing is a kind of slide bearings, each of which supports the rotary shaft via an oil film of a lubricant existing between the rotary shaft and the pads. In such a tilting pad journal bearing, if the temperature of an opposite surface of each of the pads opposite the rotary shaft increases, the pad is burned out and therefore the tilting pad journal bearing may not appropriately function as a bearing.

Accordingly, technological developments have been promoted to suppress an increase of temperature of an opposite surface of a pad. For example, in Patent Document 1, the fact that the temperature of an opposite surface of a pad increases downstream in a rotation direction of a rotary shaft is focused on, and the pad configured so as to suppress an increase of temperature in a portion of the opposite surface, which is located at a downstream end in the rotation direction is disclosed. Specifically, an oil supply groove is provided in a portion (at a rear end portion) of the opposite surface (a sliding surface) of the pad, which is located at the downstream end in the rotation direction; therefore, the increase of temperature of the opposite surface can be suppressed by a lower-temperature lubricant supplied from the oil supply groove.

CITATION LIST

Patent Document

Patent Document 1: JP 2009-030704A

SUMMARY OF THE INVENTION

However, in the tilting pad journal bearing of Patent Document 1, the oil supply groove formed on the opposite surface of the pad is formed to extend to a downstream end of the pad. Accordingly, a flow path of the lubricant existing between the rotary shaft and the opposite surface suddenly expands at the downstream end of the pad and therefore negative pressure is generated in the oil supply groove. Consequently, the pressure generated on the opposite surface of the pad for supporting the rotary shaft is decreased. As a result, the load supporting capability of the bearing or the effect of vibration suppression by an oil film may be deteriorated.

A tilting pad journal bearing according to the present invention is thus intended to suppress an increase of temperature of an opposite surface of a pad opposite a rotary shaft and to prevent a decrease of pressure on the opposite surface of the pad.

In order to attain the foregoing object, a tilting pad journal bearing of the present invention supports a rotary shaft by a plurality of pads arranged around the rotary shaft so that the rotary shaft is rotatable, wherein an oil supply unit is provided in a portion of an opposite surface of at least one of the plurality of pads opposite the rotary shaft, the portion being located at a downstream end in a rotation direction of the rotary shaft, and the oil supply unit is formed along a portion of an isopleth of the distribution of pressure generated on the opposite surface by a lubricant caught between the rotary shaft and the opposite surface, the portion of the isopleth being located downstream of a maximum pressure point of the distribution of pressure in the rotation direction.

In the present invention, the oil supply unit is formed in the portion, which is located at the downstream end, of the opposite surface of the pad where temperature easily increases; therefore, an increase of temperature of the opposite surface can be effectively suppressed. In addition, the oil supply unit is formed along the isopleth of the distribution of pressure generated on the opposite surface by the lubricant caught between the rotary shaft and the opposite surface. Accordingly, the pressure generated on the opposite surface can be inhibited from decreasing due to the presence of the oil supply unit as described below. Thus, according to the present invention, the increase of temperature of the opposite surface of the pad can be suppressed, and the decrease of pressure on the opposite surface of the pad can be inhibited.

BRIEF DESCRIPTION OF DRAWINGS

FIG. 5 is a schematic view showing a modified example of the oil supply unit.

FIG. 6 is a schematic view showing another modified example of the oil supply unit.

FIG. 7 is a schematic view showing still another modified example of the oil supply unit.

FIG. 8 is a schematic view showing a further modified example of the oil supply unit.

DESCRIPTION OF EMBODIMENTS

Hereinafter, an embodiment of a tilting pad journal bearing according to the present invention will be described with reference to the drawings. The tilting pad journal bearing is suitable for supporting a rotary shaft of a rotary machine which rotates at high speed. A specific example of the rotary machine may include a machine such as a compressor which compresses a fluid, a device such as a pump or a blower which pumps a fluid, or a machine such as a turbine which expands a fluid.

Figure 1:
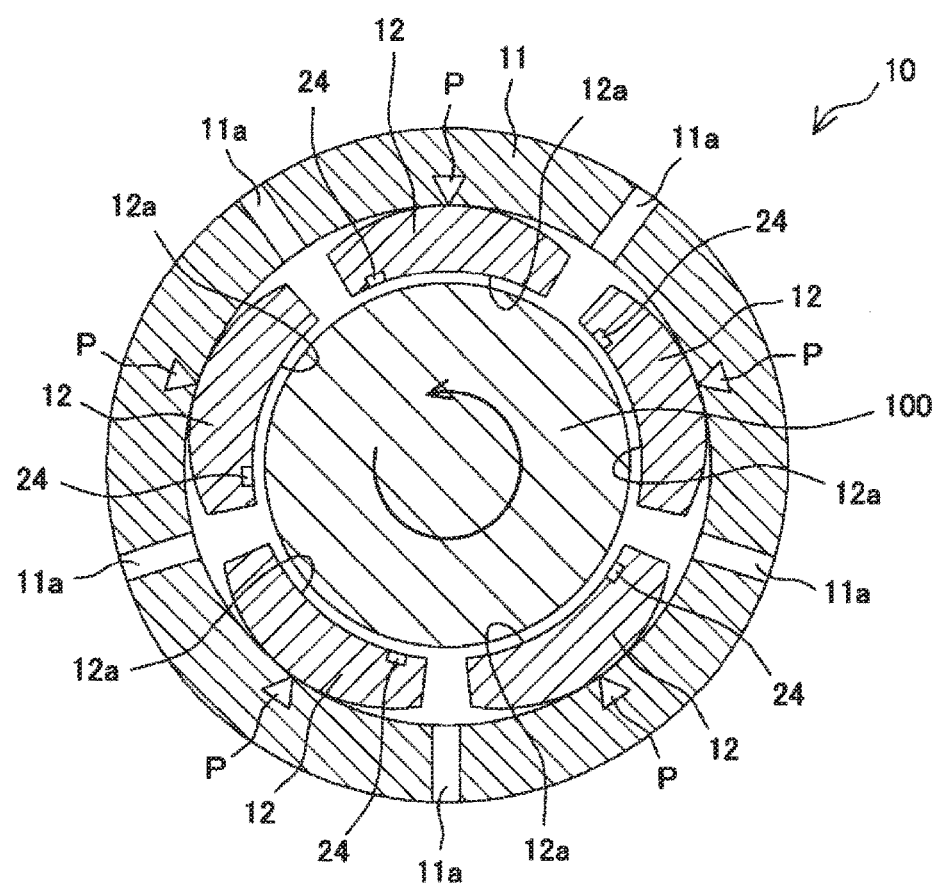
FIG. 1 is a cross-sectional view of a tilting pad journal bearing according to an embodiment of the present invention.

FIG. 1 is a cross-sectional view of the tilting pad journal bearing of the present embodiment, showing a cross-section perpendicular to an axial direction of the rotary shaft. A tilting pad journal bearing 10 is configured such that plural pads 12 (five pads in the present embodiment) are circumferentially arranged on an inner side of a cylindrical housing 11, and a rotary shaft 100 is rotatably supported by the plural pads 12. Each of the pads 12 is in contact via a supporting point P, which is schematically illustrated, with an inner circumferential surface of the housing 11 so as to be swingable around the supporting point P in a cross-section perpendicular to an axial direction of the rotary shaft 100 (which will be hereinafter simply referred to as "an axial direction").

Through-holes 11a extending from an outer circumferential surface of the housing 11 to the inner circumferential surface thereof are formed in the circumferential surfaces of the housing 11 and each of the through-holes 11a is located between the two pads 12 circumferentially arranged next to each other. As will be described later, a lubricant used for lubricating or cooling the tilting pad journal bearing 10 is supplied through the through-holes 11a into the housing 11. In addition, the number of through-holes 11a or the position thereof may be changed as appropriate. For example, the through-hole 11a may be formed not in the circumferential surfaces of the housing 11 but in side surfaces thereof.

The lubricant flows in a clearance between the rotary shaft 100 and an opposite surface 12a of each of the pads 12 opposite the rotary shaft 100 and thereby an oil film is formed. When the rotary shaft 100 rotates, the lubricant is caught into the clearance between the rotary shaft 100 and the opposite surfaces 12a to be caught downstream in a rotation direction of the rotary shaft 100 (which will be hereinafter simply referred to as "a rotation direction"); therefore, a wedge effect to allow the rotary shaft 100 to float is produced. At this time, the lubricant flows downstream in the rotation direction between the rotary shaft 100 and the opposite surface 12a, and due to a viscous friction generated at this time, the temperature of the lubricant increases. Therefore, the temperature of the lubricant increases downstream in the rotation direction. As a result, the temperature of the opposite surface 12a of the pad 12 increases downstream in the rotation direction.

When the temperature of the opposite surface 12a of the pad 12 becomes excessively high, the pad 12 is burned out and therefore the tilting pad journal bearing 10 may not appropriately function as a bearing. In particular, a soft white metal with high conformability is often applied to the opposite surface 12a. However, the melting point of the white metal is low; therefore, the pad may be easily burned out. In order to prevent such a defect, in the present embodiment, an oil supply groove 24 is provided as "an oil supply unit" of the present invention in a portion of the opposite surface 12a, which is located at a downstream end in the rotation direction. The relatively low-temperature lubricant is supplied from the oil supply groove 24; thereby, the increase of temperature of the opposite surface 12a can be effectively suppressed.

Figure 2:
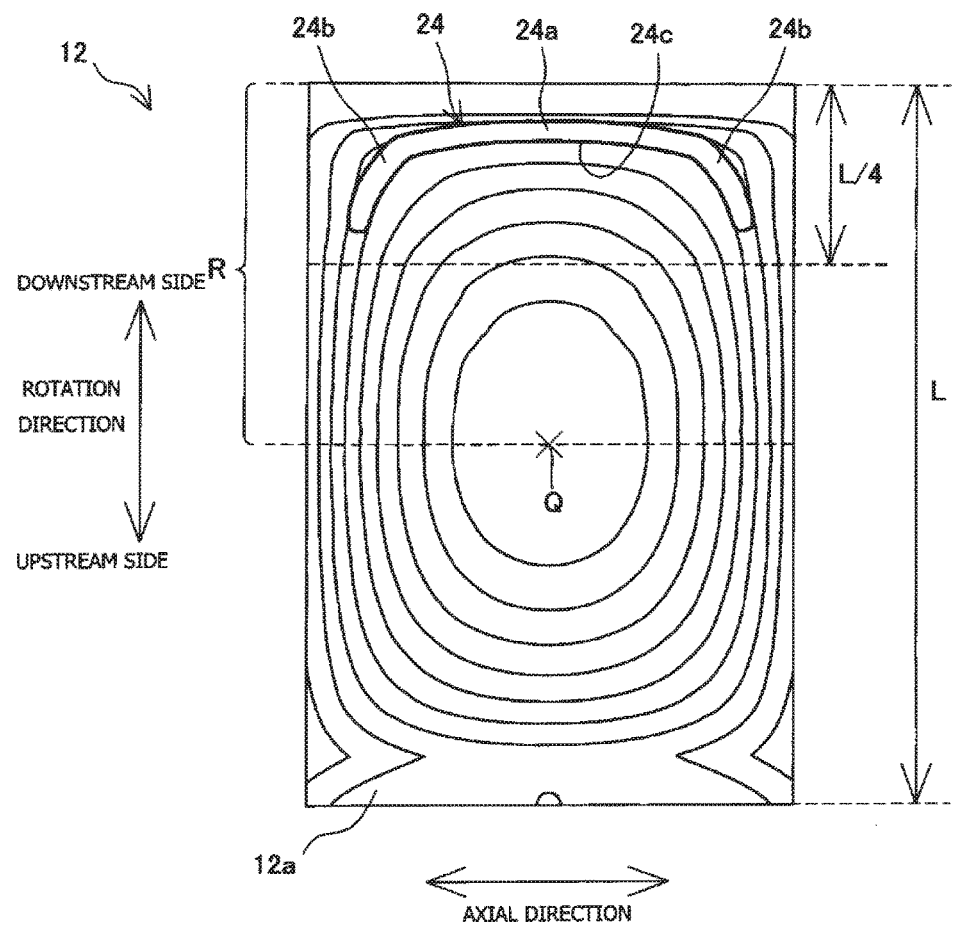
FIG. 2 is a view showing an example of the distribution of pressure generated on an opposite surface of a pad.

Here, FIG. 2 shows an example of the distribution of pressure generated on the opposite surface 12a by the lubricant caught between the rotary shaft 100 and the opposite surface 12a of the pad 12 in a state before the oil supply groove 24 is formed in the opposite surface 12a. Isopleths of the distribution of pressure are substantially in a concentric pattern, and a maximum pressure point. Q is provided in the center of the opposite surface 12a. The isopleths are distributed in such that pressure decreases toward a periphery of the opposite surface 12a. As shown in FIG. 2, the foregoing oil supply groove 24 is formed along the isopleth in a portion R of the opposite surface 12a so as to be located downstream of the maximum pressure point Q in the rotation direction, and in a portion of the opposite surface 12a having a quarter of the length of the opposite surface 12a from the downstream end in the rotation direction.

In addition, the fact that the oil supply groove is formed along the isopleth means that the oil supply groove may be formed on the isopleth or between the isopleths adjacent to each other and that the oil supply unit is provided in a portion of the opposite surface to which substantially uniform pressure is applied, as will be similarly described below.

Specifically, the oil supply groove 24 mainly includes a center portion 24a extending in the axial direction and end portions 24b curved from opposite ends of the center portion toward the upstream side in the rotation direction, and the oil supply groove 24 as a whole is formed in a U-shape symmetric with respect to the axial direction. Here, the fact that the oil supply groove 24 is formed along the isopleth means that the oil supply groove 24 is formed to be approximately coincident with or approximately parallel to the isopleth. It is not necessary that the oil supply groove 24 is precisely coincident with or parallel to the isopleth. Also, in the present embodiment, the oil supply groove 24 is formed along the isopleth such that an outline 24c of outlines of the oil supply groove 24, which is located adjacent to the upstream side in the rotation direction, that is, which is located adjacent to a high-pressure side, is approximately coincide with or approximately parallel to the isopleth.

Figure 3:
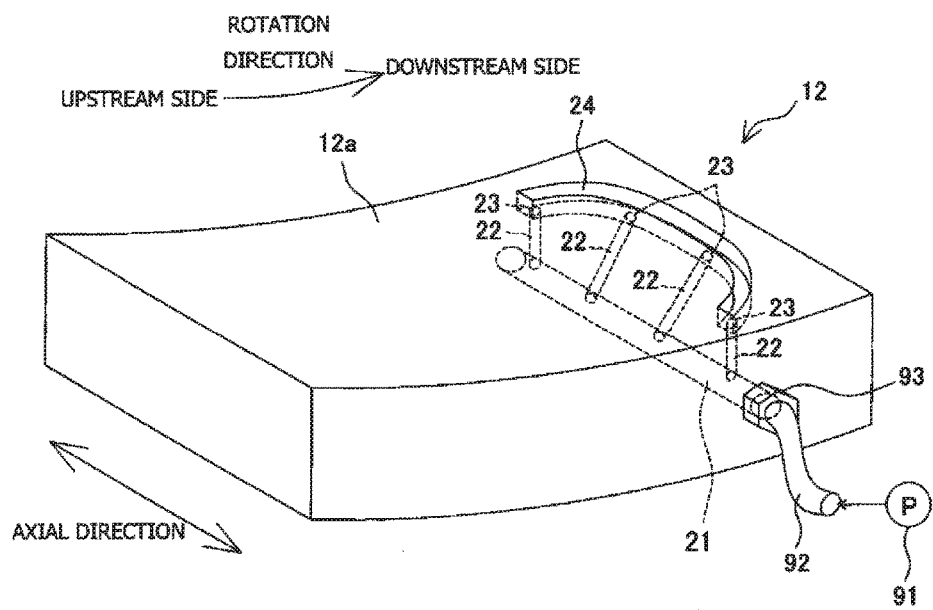
FIG. 3 is a perspective view showing the pad in detail.
Figure 4:
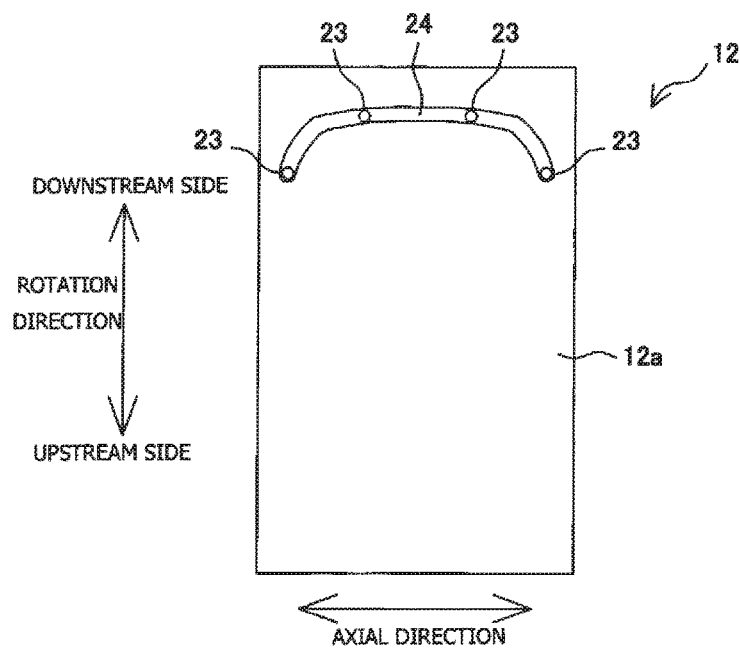
FIG. 4 is a schematic view showing an oil supply groove as an oil supply unit.

FIG. 3 is a perspective view showing the pad 12 in detail. FIG. 4 is a schematic view showing the oil supply groove 24 as the oil supply unit. As shown in FIG. 3, a main oil supply passage 21 and plural auxiliary oil supply passages 22 for supplying the lubricant to the oil supply groove 24 are formed inside the pad 12. The main oil supply passage 21 is formed in the axial direction from one side surface to the other side surface of the pad 12. The main oil supply passage 21 is not a through-hole extending from one side surface to the other side surface, and the main oil supply passage 21 is not opened to the other side surface and is closed thereat.

The auxiliary oil supply passages 22 are each an oil passage connecting the main oil supply passage 21 and the oil supply groove 24 to each other. In the present embodiment, the four auxiliary oil supply passages 22 are connected to a bottom surface of the oil supply groove 24. Oil supply ports 23 via which the auxiliary oil supply passages 22 are connected to the oil supply groove 24 are formed at substantially equal intervals in a longitudinal direction of the oil supply groove 24 (in a direction along the isopleth) (see FIG. 4). Therefore, the lubricant can be uniformly supplied to an entire area of the oil supply groove 24 extending in the longitudinal direction. Also, the oil supply ports 23 are arranged at opposite ends of the oil supply groove 24 in the longitudinal direction; thereby, the lubricant can be surely supplied to the ends of the oil supply groove 24. In addition, the number of auxiliary oil supply passages 22 or the position thereof and the number of oil supply ports 23 or the position thereof may be changed as appropriate.

An oil feeding tube 92 is connected to the main oil supply passage 21 formed in the pad 12. The oil feeding tube 92 is configured by a tube or the like having appropriate flexibility, and the lubricant pumped from a pump 91 flows in the oil feeding tube 92. The oil feeding tube 92 is oil-tightly fixed to the main oil supply passage 21 by a fixing means 93 such as a screw. In addition the oil feeding tube 92 is inserted to extend through the through-hole 11a (see FIG. 1) formed in the housing 11, and the oil feeding tube 92 is installed from the outside of the housing 11 through the through-hole 11a to the inside of the housing 11. A seal member (not shown) for preventing the lubricant from leaking from a clearance between the through-hole 11a and the oil feeding tube 92 is provided in the through-hole 11a.

In the tilting pad journal bearing 10 configured as described above, the lubricant pumped from the pump 91 is supplied through the oil feeding tube 92, the main oil supply passage 21, the respective auxiliary oil supply passages 22, and the respective oil supply ports 23 to the oil supply groove 24. The lubricant supplied into the oil supply groove 24 forms an oil film in the clearance between the rotary shaft 100 and the opposite surface 12a of the pad 12. As described above, on the opposite surface 12a of the pad 12, the temperature increases downstream in the rotation direction. However, the relatively low-temperature lubricant is supplied from the oil supply groove 24 formed in the portion located at the downstream end in the rotation direction; thereby, the increase of temperature of the opposite surface 12a located downstream in the rotation direction can be effectively suppressed.

Also, the oil supply groove 24 is not formed so as to extend to the downstream end in the rotation direction as in the oil supply groove of Patent Document 1. Therefore, large negative pressure is not generated in the oil supply groove 24. Furthermore, as shown in FIG. 2, the oil supply groove 24 is formed along the isopleth of the distribution of pressure generated on the opposite surface 12a of the pad 12. In other words, in a portion (a portion close to the center) which is located closer to the high-pressure side than a portion where the oil supply groove 24 is formed, the distribution of pressure is inhibited from changing due to the presence of the oil supply groove 24. Accordingly, in the portion close to the high-pressure side, a decrease of pressure due to the presence of the oil supply groove 24 can be inhibited. Therefore, in the portion close to the high-pressure side, the pressure can be maintained at high level and thus the decrease of pressure on the opposite surface 12a can be effectively suppressed.

As described above, according to the tilting pad journal bearing 10 of the present embodiment, the increase of temperature of the opposite surface 12a of the pad 12 opposite the rotary shaft 100 is suppressed, and the decrease of pressure on the opposite surface 12a can be suppressed. As a result, the opposite surface 12a can be prevented from being burned out, and in addition, the load supporting capability of the tilting pad journal bearing 10 or the effect of vibration suppression (damping) by an oil film between the rotary shaft 100 and the opposite surface 12a can be effectively maintained.

Also, in the present embodiment, as shown in FIG. 2, the oil supply groove (oil supply unit) 24 is formed along a portion of the isopleths of the distribution of pressure, which is in the portion R located downstream of the maximum pressure point Q of the pressure distribution in the rotation direction. As just described, the oil supply groove 24 is provided only in the portion R located downstream of the maximum pressure point Q. Accordingly, a portion where an oil film is not formed by the presence of the oil supply groove 24 is inhibited from expanding and therefore a wide range of oil film can be formed. As a result, the effect of vibration suppression (damping) by the oil film can be further increased.

Furthermore, in the present embodiment, the oil supply groove 24 is formed along the isopleth such that the outline 24c (see FIG. 2) of the outlines of the oil supply groove 24, which is located adjacent to the high-pressure side, is approximately coincide with or approximately parallel to the isopleth. Accordingly, the oil supply groove 24 does not exist in the portion located closer to the high-pressure side than such isopleth. Therefore, the decrease of pressure in the portion close to the high-pressure side can be further surely suppressed.

Also, in the present embodiment, the oil supply groove 24 is provided in a portion of the opposite surface 12a having a quarter of the length of the opposite surface 12a from the downstream end in the rotation direction. Thus, the portion located at the downstream end in the rotation direction where the oil supply groove 24 is provided is defined to have a quarter of the length of the opposite surface 12a from the end. Therefore, in a portion where temperature increases more significantly, the increase of temperature can be suppressed, and in addition, influences caused by changes in the distribution of pressure due to the oil supply groove 24 can be further surely reduced in the center of the opposite surface 12a where pressure is high.

Further, if the end portions 24b (see FIG. 2) of the oil supply groove 24 in the longitudinal direction are curved toward the high-pressure side (the center) as in the present embodiment, the relatively low-temperature lubricant is easily supplied to the center portion in the axial direction. Therefore, the increase of temperature of the opposite surface 12a can be further effectively suppressed.

Furthermore, in the present embodiment, the oil feeding tube 92 is connected to the oil supply passage 21, whereby the lubricant can be supplied to the oil supply groove 24 in a state where hydraulic pressure of the lubricant supplied from the pump 91 is maintained. Therefore, the decrease of pressure on the opposite surface 12a can be further surely suppressed.

Modified Example

In the embodiment described above, the single oil supply groove 24 formed along the isopleth is provided as "the oil supply unit" of the present invention; however, the oil supply unit may not have to be configured in such a manner. For example, the oil supply unit may be configured as in respective modified examples described below. Explanations of common configurations to the foregoing embodiment r to the respective modified examples are omitted as appropriate. Also, explanations of effects achieved by the common configurations are omitted as appropriate.

As shown in FIG. 5, plural oil supply grooves 25, 26 (here, two oil supply grooves) parallel to each other may be provided as "the oil supply unit" of the present invention. Here, it is not necessary that the oil supply grooves are exactly parallel to each other. The oil supply grooves 25, 26 may be substantially parallel to each other without intersecting with each other. The plural oil supply grooves 25, 26 are provided in this manner; thereby, a range to which the lubricant can be supplied is increased. Therefore, the increase of temperature of the opposite surface 12a of the pad 12 can be further effectively suppressed.

Also, if the plural oil supply grooves 25, 26 are provided as just described, all of the oil supply grooves 25, 26 are preferably provided in a portion of the opposite surface 12a having a quarter of the length of the opposite surface 12a from the downstream end in the rotation direction. Further, the oil supply groove 26 of the plural oil supply grooves 25, 26, which is located at the most upstream side in the rotation direction is preferably formed along the isopleth. Furthermore, more preferably, the oil supply groove 26 located at the most upstream side in the rotation direction has an outline adjacent to the high-pressure side (the upstream side in the rotation direction) and the outline is approximately coincident with or approximately parallel to the isopleth.

Further, as shown in FIG. 6, the oil supply groove 24, for example, of FIG. 4, provided as "the oil supply unit" of the present invention may be longitudinally divided into plural oil supply grooves 27, 28, 29 (here, three oil supply grooves). At least one oil supply port 23 is provided at each of the oil supply grooves 27, 28, 29. Thus, the longitudinal length of each of the oil supply grooves 27, 28, 29 is short. Accordingly the lubricant is easily supplied throughout each of the oil supply grooves 27, 28, 29. The respective oil supply ports 23 are preferably provided at opposite longitudinal ends of each of the oil supply grooves 27, 28, 29.

Furthermore, as shown in FIG. 7, the oil supply groove 25 and the oil supply groove 26, for example, of FIG. 5, provided as "the oil supply unit" of the present invention may be respectively divided into plural oil supply grooves 30, 31, 32 (here, three oil supply grooves) and plural oil supply grooves 33, 34, 35 (here, three oil supply grooves). At least one oil supply port 23 is provided at each of the oil supply grooves 30 to 35. Thus, the longitudinal length of each of the oil supply grooves 30 to 35 is short. Accordingly, the lubricant is easily supplied throughout each of the oil supply grooves 30 to 35. The respective oil supply ports 23 are preferably provided at opposite longitudinal ends of each of the oil supply grooves 30 to 35.

Also, as shown in FIG. 8, plural grooves extending along the isopleths are connected to each other to form an oil supply groove 36 having a closed shape and such an oil supply groove 36 may be provided as "the oil supply unit" of the present invention. Here, as an example, opposite longitudinal ends of the oil supply groove 25 of FIG. 5 are connected to corresponding opposite longitudinal ends of the oil supply groove 26 of FIG. 5; thereby the oil supply groove 36 having the closed shape is formed. Thus, the oil supply groove 36 may extend in a wide range. Accordingly, a range to which the lubricant can be supplied is increased. Therefore, the increase of temperature of the opposite surface 12a of the pad 12 can be further effectively suppressed. In addition, since the oil supply groove 36 has the closed shape, at least one oil supply port 23 is provided at the oil supply groove 36 and thereby the lubricant can be supplied throughout the oil supply groove 36. However, in order that the lubricant is surely supplied to the entire oil supply groove 36, the plural oil supply ports 23 are preferably provided.

Figure 9:
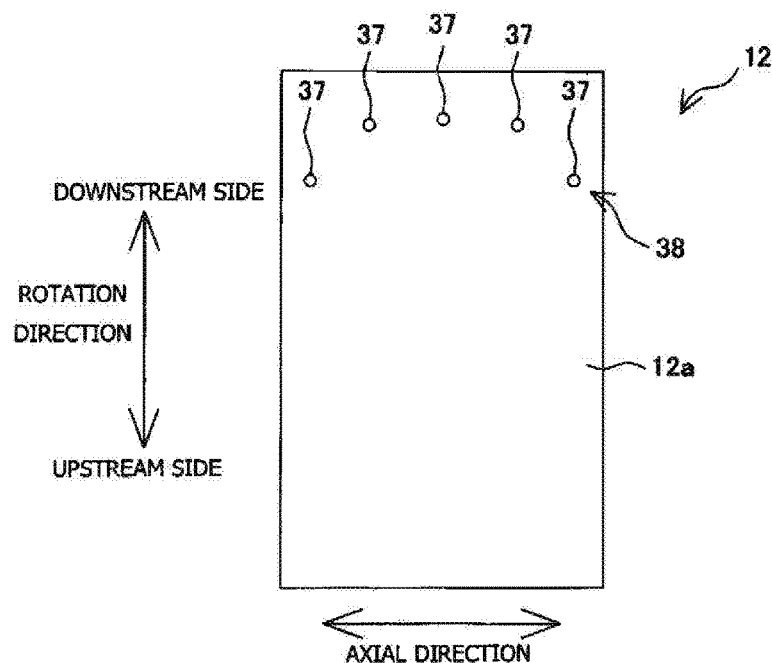
FIG. 9 is a schematic view showing another modified example of the ail supply unit.

Further, as shown in FIG. 9, not an oil supply groove but also a row of oil supply holes 38 formed of plural oil supply holes 37 formed along the isopleth may be provided as "the oil supply unit" of the present invention. In other words, an oil supply groove is not provided in this modified example. Alternatively, the auxiliary oil supply passages 22 (see FIG. 3) are provided to extend to the opposite surface 12a of the pad 12, and openings of the auxiliary oil supply passages 22 in the opposite surface 12a function as the oil supply holes 37. Accordingly, the oil supply holes 37 are arranged along the isopleth, therefore configuring the row of oil supply holes 38 as the oil supply unit. The row of oil supply holes 38 that is a group of oil supply holes 37 is provided as the oil supply unit; thereby, the opening area of the oil supply unit can be reduced, and influences of the oil supply unit on the distribution of pressure on the opposite surface 12a can be further reduced.

Figure 10:
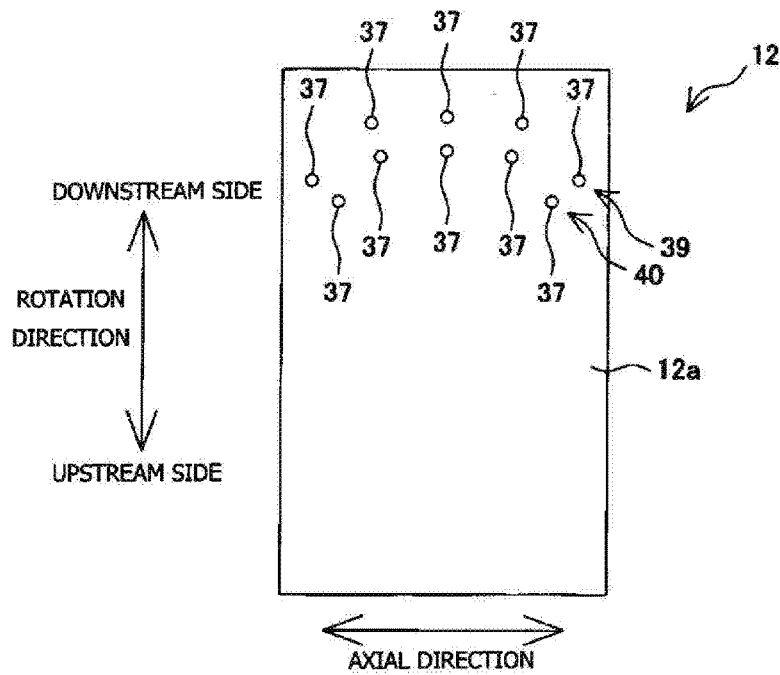
FIG. 10 is a schematic view showing still another modified example of the oil supply unit.

Furthermore, as shown in FIG. 10, plural rows of oil supply holes 39, 40 may be provided as "the oil supply unit" of the present invention. The plural rows of oil supply holes 39, 40 are provided in this manner; thereby, a range to which the lubricant can be supplied is increased. Therefore, the increase of temperature of the opposite surface 12a of the pad 12 can be further effectively suppressed. If the plural rows of oil supply holes 39, 40 are provided as just described, all of the rows of oil supply holes 39, 40 are preferably provided in a portion of the opposite surface 12a having a quarter of the length of the opposite surface 12a from the downstream end in the rotation direction. Also, the row of oil supply holes 40 of the plural rows of oil supply holes 39, 40, which is located at the most upstream side in the rotation direction is preferably formed along the isopleth.

Other Embodiment

The present invention is not limited to the foregoing embodiment, and without departing from the scope of the present invention, elements of the foregoing embodiment may be combined as appropriate or various modifications may be made.

For example, the number of pads 12 or the position thereof, or specific shapes are not limited to those described in the foregoing embodiment and may be modified as appropriate.

Also, the specific configuration of the oil supply unit is not limited to that described in the foregoing embodiment including the respective modified examples. For example, an oil supply groove and an oil supply hole can be combined as the oil supply unit.

Furthermore, in the foregoing embodiment, as shown in FIG. 1, the oil supply unit (oil supply groove 24) is provided at each of the plural pads 12. However, as long as the oil supply unit is provided at least at the pad 12 to which a load acting on the rotary shaft 100 is applied, it is not necessary that the oil supply unit is formed at each of the pads 12. This aspect will be described below.

Figure 11:
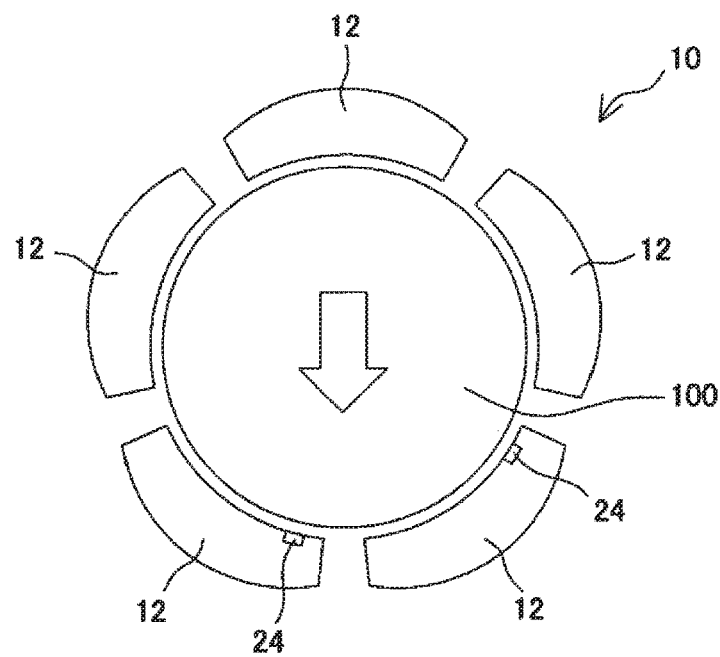
FIG. 11 is a schematic view for illustrating the pads on which the oil supply unit is provided.
Figure 12:
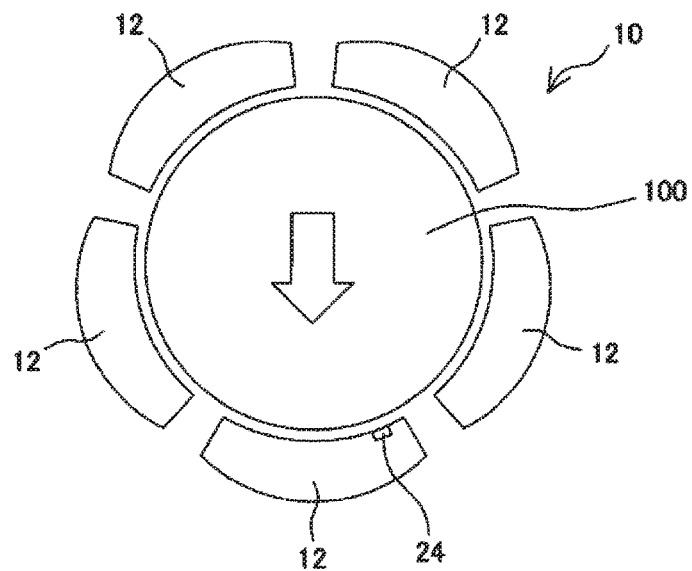
FIG. 12 is a schematic view for illustrating the pads on which the oil supply unit is provided.

FIGS. 11 and 12 are each a schematic view illustrating the pad 12 on which the oil supply unit is provided. Here, the oil supply groove 24 is illustrated as an example of the oil supply unit; however, the configuration of the oil supply unit is not limited to this example. The oil supply unit may be configured as described in the respective modified examples. Not only the rotary shaft's own weight but also a force from a gear or the like connected to the rotary shaft 100 may act on the rotary shaft 100. A load acting on the rotary shaft 100 means a resultant of the rotary shaft's own weight and the force. Here, the load acts in the direction indicated by an arrow in each of FIGS. 11 and 12.

FIG. 11 illustrates a case where the load acting on the rotary shaft 100 is received by the two pads 12 of the five pads 12, which are located at the lowest side. Meanwhile, FIG. 12 illustrates a case where the load acting on the rotary shaft 100 is received by the one pad 12 of the five pads 12, which is located at the lowest side. A system in which the load acting on the rotary shaft 100 is received by the two pads 12 is referred to as Load Between Pads (LBP), as shown in FIG. 11, and a system in which the load acting on the rotary shaft 100 is received by the one pad 12 is referred to as Load On Pad (LOP), as shown in FIG. 12.

In the case of LBP, the rotary shaft 100 is pressed against the two pads 12 receiving the load; therefore, an oil film between the rotary shaft 100 and the pads 12 becomes thin and thus the temperature of the opposite surfaces 12a of the two pads 12 easily increases. Accordingly, as shown in FIG. 11, the oil supply groove 24 is provided at each of the two pads 12 receiving the load; thereby, temperature increase and pressure decrease on the opposite surfaces 12a of the two pads 12 can be suppressed. Meanwhile, in the case of LOP, the temperature of the opposite surface 12a of the one pad 12 receiving the load easily increases. Accordingly, as shown in FIG. 12, the oil supply groove 24 is provided at the one pad 12 receiving the load; thereby, temperature increase and pressure decrease on the opposite surface 12a of the one pad 12 can be suppressed. As described above, the oil supply unit (oil supply groove 24) is provided at least at the pad 12 receiving the load acting on the rotary shaft 100; thereby, the increase of temperature on the pad 12 on which the temperature easily increases can be effectively suppressed, and in addition, the load supporting capability can be effectively maintained.

The present invention has been described in detail and with reference to the particular embodiments; however, it will be understood by those skilled in the art that various changes or modifications can be made to the present invention without departing from the spirit and scope of the present invention.

This application is based on Japanese Patent Application No. 2015-014219 filed on Jan. 28, 2015, the entire contents of which are incorporated by reference herein.

INDUSTRIAL APPLICABILITY

A tilting pad journal bearing of the present invention can suppress an increase of temperature of an opposite surface of a pad opposite a rotary shaft and can prevent a decrease of pressure on the opposite surface of the pad, therefore having high durability under high-speed rotation.

EXPLANATION OF REFERENCE NUMERALS

10: Tilting pad journal bearing
12: Pad
12a: Opposite surface
21: Main oil supply passage (oil supply passage)
22: Auxiliary oil supply passage (oil supply passage)
24 to 36: Oil supply groove (oil supply unit)
37: Oil supply hole
38 to 40: Row of oil supply holes (oil supply unit)
91: Pump
92: Oil feeding tube
100: Rotary shaft

The invention claimed is:

1. A tilting pad journal bearing which supports a rotary shaft by a plurality of pads arranged around the rotary shaft so that the rotary shaft is rotatable,
   wherein an oil supply unit is provided in a portion of an opposite surface of at least one of the plurality of pads opposite the rotary shaft, the portion being located at a downstream end in a rotation direction of the rotary shaft, and
   the oil supply unit is formed along a portion of an isopleth of the distribution of pressure generated on the opposite surface by a lubricant caught between the rotary shaft and the opposite surface, the portion of the isopleth being located downstream of a maximum pressure point of the distribution of pressure in the rotation direction.

2. The tilting pad journal bearing according to claim 1, wherein the portion of the isopleth located downstream is a portion of the opposite surface, which has a quarter of the length of the opposite surface from the downstream end of the opposite surface in the rotation direction.

3. The tilting pad journal bearing according to claim 1, wherein at least one oil supply groove formed along the isopleth is provided as the oil supply unit.

4. The tilting pad journal bearing according to claim 3, wherein the at least one oil supply groove includes a plurality of oil supply grooves arranged parallel to each other.

5. The tilting pad journal bearing according to claim 4, wherein the at least one oil supply groove is divided into plural oil supply grooves in a direction along the isopleth.

6. The tilting pad journal bearing according to claim 3, wherein the at least one oil supply groove is divided into plural oil supply grooves in a direction along the isopleth.

7. The tilting pad journal bearing according to claim 1, wherein plural grooves each extending along the isopleth are connected to each other to form an oil supply groove having a closed shape, the oil supply groove being provided as the oil supply unit.

8. The tilting pad journal bearing according to claim 1, wherein at least one row of oil supply holes, which is formed of plural oil supply holes and is formed along the isopleth, is provided as the oil supply unit.

9. The tilting pad journal bearing according to claim 8, wherein the at least one row of oil supply holes includes a plurality of rows of oil supply holes.

10. The tilting pad journal bearing according to claim 1, wherein the oil supply unit is provided in at least one of the pads, which receives a load acting on the rotary shaft.

11. The tilting pad journal bearing according to claim 1, wherein an oil feeding tube through which the lubricant pumped from a pump flows is connected to an oil supply passage which is formed within each of the pads to supply the lubricant to the oil supply unit.

12. A tilting pad journal bearing which supports a rotary shaft by a plurality of pads arranged around the rotary shaft so that the rotary shaft is rotatable,
   wherein an oil supply unit is provided in a portion of an opposite surface of at least one of the plurality of pads opposite the rotary shaft, the portion being located at a downstream end in a rotation direction of the rotary shaft, and
   the oil supply unit is formed along a portion of an isopleth of the distribution of pressure generated on the opposite surface by a lubricant caught between the rotary shaft and the opposite surface, the oil supply unit in its entirety being located only downstream of a maximum pressure point of the distribution of pressure in the rotation direction.

13. The tilting pad journal bearing according to claim 12, wherein the oil supply unit includes an oil supply groove.

14. The tilting pad journal bearing according to claim 12, wherein the oil supply unit includes a plurality of oil supply grooves.

15. The tilting pad journal bearing according to claim 12, wherein the oil supply unit includes a row of oil supply holes.

* * * * *